(12) United States Patent
Deering et al.

(10) Patent No.: US 12,175,190 B2
(45) Date of Patent: *Dec. 24, 2024

(54) METHOD FOR PARTIALLY PUBLISHING EDITS TO A DOCUMENT

(71) Applicant: WORKIVA INC., Ames, IA (US)

(72) Inventors: Hannah Joy Deering, Ames, IA (US); Thieu Van Tran Pham, Mesa, AZ (US); Travis Smith, Ames, IA (US); Edward Joseph Cupps, Ames, IA (US); Aaron David Hall, Bozeman, MT (US); Matthew Peter Hinrichsen, Ames, IA (US); Ryan A. King, Ankeny, IA (US); Joshua John Przybyszewski, Ames, IA (US); Madelyn Renee Stephens, Des Moines, IA (US)

(73) Assignee: WORKIVA INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,044

(22) Filed: Jan. 5, 2024

(65) Prior Publication Data

US 2024/0143905 A1 May 2, 2024

Related U.S. Application Data

(63) Continuation of application No. 17/867,040, filed on Jul. 18, 2022, now Pat. No. 11,868,712, which is a
(Continued)

(51) Int. Cl.
*G06F 40/177* (2020.01)
*G06F 40/106* (2020.01)
(Continued)

(52) U.S. Cl.
CPC .......... *G06F 40/177* (2020.01); *G06F 40/106* (2020.01); *H04L 67/306* (2013.01); *H04L 67/535* (2022.05)

(58) Field of Classification Search
None
See application file for complete search history.

(56) References Cited

U.S. PATENT DOCUMENTS

| | | |
|---|---|---|
| 5,515,491 A | 5/1996 | Bates et al. |
| 11,392,760 B2 | 7/2022 | Deering et al. |

(Continued)

OTHER PUBLICATIONS

Clickhelp, "The Partial Update Publishing Mode," retrieved on Nov. 2, 2021, https://clickhelp.com/software-documentation-tool/user-manual/the-partial-update-publishing-mode.html, 5 pages.
(Continued)

*Primary Examiner* — Ryan Barrett
(74) *Attorney, Agent, or Firm* — Faegre Drinker Biddle & Reath LLP

(57) ABSTRACT

A method for partially publishing edits to a document is described. A first document including a first cell and a second cell is displayed on first user account on a first computing device and on a second user account. A second document including a linked version of the first cell and a linked version of the second cell is displayed. An edit of the first cell is received from the first user account and an edit of the second cell is received. In response to receiving an indication from the first user account that the edit of the first cell is to be published, the edit of the first cell is made to the linked version of the first cell, while the linked version of the second cell is unchanged so that the content of the linked version of the second cell no longer matches that of the second cell.

20 Claims, 12 Drawing Sheets

Related U.S. Application Data continuation of application No. 17/005,445, filed on Aug. 28, 2020, now Pat. No. 11,392,760.

(60) Provisional application No. 62/893,430, filed on Aug. 29, 2019.

(51) Int. Cl.
*H04L 67/306* (2022.01)
*H04L 67/50* (2022.01)

(56) References Cited

U.S. PATENT DOCUMENTS

| | | |
|---|---|---|
| 2009/0172558 A1 | 7/2009 | Pickens et al. |
| 2012/0159355 A1 | 6/2012 | Fish et al. |
| 2014/0365886 A1 | 12/2014 | Koenig et al. |
| 2015/0019999 A1 | 1/2015 | Page |
| 2017/0339229 A1 | 11/2017 | Miller et al. |
| 2020/0409667 A1 | 12/2020 | McKinnon et al. |
| 2021/0081605 A1 | 3/2021 | Smith et al. |
| 2022/0358170 A1 | 11/2022 | Harper et al. |

OTHER PUBLICATIONS

Everitt, "Only Commit Some Changes," Apr. 17, 2019, https://www.jetbrains.com/pycharm/guide/tips/partial-commit, 3 pages.

Fender, "Understanding IMPORTRANGE in Google Sheets," Feb. 20, 2019, https://www.tillerhq.com/understanding-importrange-in-google-sheets/, 16 pages.

Grubbs, "Google Sheets 101: The Beginner's Guide to Online Spreadsheets," Jul. 13, 2016, https://zapier.com/learn/google-sheets/google-sheets-tutorial/, 23 pages.

Guhlin, "Exploring Google Sheets' Functions: Import Range," Aug. 18, 2018, https://blog.tcea.org/google-sheets-import-range/, 9 pages.

| | A | B | C | D | E |
|---|---|---|---|---|---|
| 1 | | | | Number of Subscribers | 115,000 |
| 2 | Revenues | | | Headcount | 97 |
| 3 | Merchandise Sales | 1,450,000 | | | |
| 4 | User Subscriptions | 560,000 | | | |
| 5 | Total Revenue | | 2,010,000 | | |
| 6 | | | | | |
| 7 | Expenses | | | | |
| 8 | Salaries | 500,000 | | | |
| 9 | Real Estate | 1,340,000 | | | |
| 10 | Total Expenses | | 1,840,000 | | |
| 11 | | | | | |
| 12 | | | | | |

FIG. 3B

| | A | B | C | D | E |
|---|---|---|---|---|---|
| 1 | | | | Number of Subscribers | 115,000 |
| 2 | Revenues | | | | |
| 3 | Merchandise Sales | 1,450,000 | | | |
| 4 | User Subscriptions | 560,000 | | Headcount | 97 |
| 5 | Total Revenue | | 2,010,000 | | |
| 6 | | | | | |
| 7 | Expenses | | | | |
| 8 | Salaries | 500,000 | | | |
| 9 | Real Estate | 1,340,000 | | | |
| 10 | Total Expenses | | 1,840,000 | | |
| 11 | | | | | |
| 12 | | | | | |

FIG. 3D

METHOD FOR PARTIALLY PUBLISHING EDITS TO A DOCUMENT

CROSS-REFERENCE TO RELATED APPLICATIONS

This application is a continuation of U.S. patent application Ser. No. 17/867,040, filed on Jul. 18, 2022, now U.S. Pat. No. 11,868,712, which is a continuation of U.S. patent application Ser. No. 17/005,445, filed on Aug. 28, 2020, now U.S. Pat. No. 11,392,760, which claims the priority benefit of U.S. Provisional Patent Application No. 62/893,430, filed on Aug. 29, 2019, all of which are incorporated herein by reference in their entirety.

TECHNICAL FIELD

The disclosure relates generally to cloud-based document collaboration and, more particularly, to methods for partially publishing changes to a document.

BACKGROUND

Current cloud-based document collaboration platforms usually default to real-time, unrestricted editing by all collaborators. That is, collaborators see edits made by others in real time or nearly real time, and sharing edits with people outside of the collaboration team is an all-or-nothing proposition. There are many situations however, where one may not necessarily be ready to share all of one's changes with people outside of the team.

SUMMARY

In an embodiment, a method for partially publishing edits to a document includes: displaying, on a first user account on a first computing device and on a second user account, a first document comprising a first cell and a second cell; displaying a second document comprising a linked version of the first cell and a linked version of the second cell, wherein the content of the linked version of the first cell matches that of the first cell and the content of the linked version of the second cell matches that of the second cell; receiving, from the first user account, an edit of the first cell; receiving, from the second user account, an edit of the second cell; receiving, from the first user account, an indication that the edit of the first cell is to be published; making the edit of the first cell to the linked version of the first cell; and leaving the linked version of the second cell unchanged so that the content of the linked version of the second cell no longer matches that of the second cell.

According to an embodiment, a method for partially publishing edits to a document includes displaying, on a first user account on a first computing device and on a second user account, a first cell and a second cell in a table of a first document; displaying a linked version of the first cell and a linked version of the second cell in a second document; receiving, from the first user account, an edit of the first cell; receiving an edit of the second cell; receiving, from the first user account, an indication that the edit of the first cell is to be published; making the edit of the first cell to the linked version of the first cell; and when the first and second cell are referenced by a common formula in the table, making the edit of the second cell to the linked version of the second cell.

In an embodiment, a method for partially publishing edits to a document includes displaying, on a first user account on a first computing device and on a second user account, a first document comprising a first cell and a second cell, wherein the first user account is being used by a first user and the second user account is being used by a second user; displaying a second document comprising a linked version of the first cell and a linked version of the second cell, wherein the content of the linked version of the first cell matches that of the first cell and the content of the linked version of the second cell matches that of the second cell; receiving, from the first user account, an edit to the first cell; receiving, from the second user account, an edit to the second cell; presenting, on the first user account, an on-screen control that includes a first option to publish only changes made by the first user and a second option to publish changes made by both the first user and the second user; providing an operation defined by: when the first user selects the first option, making the edit of the first cell to the linked version of the first cell, and leaving the linked version of the second cell unchanged so that the content of the linked version of the second cell no longer matches that of the second cell; when the first user selects the second option, making the edit of the first cell to the linked version of the first cell, and making the edit of the second cell to the linked version of the second cell.

DRAWINGS

While the appended claims set forth the features of the present techniques with particularity, these techniques may be best understood from the following detailed description taken in conjunction with the accompanying drawings of which:

FIGS. 3A-3G illustrate a graphical user interface in which multiple users collaborate on a document and are able to limit publication of edits to a selected subset of edits, according to an embodiment.

DETAILED DESCRIPTION

According to various embodiments, a method for partially publishing edits to a document allows users collaborating on a shared document, in which the document includes data that is being "consumed" by (is linked to) one or more other documents, to select which edits are to be published. Edits that are published are reflected in the linked versions of the data, while edits that are unpublished remain "private" to the collaborators. In the context of table cells (e.g., cells of a spreadsheet), the method makes intelligent determinations whether cells that are designated to be published should cause other cells (e.g., cells referenced by a common formula) to be published as well, even if such other cells have not been selected by any of the collaborators to be published.

Figure 1:
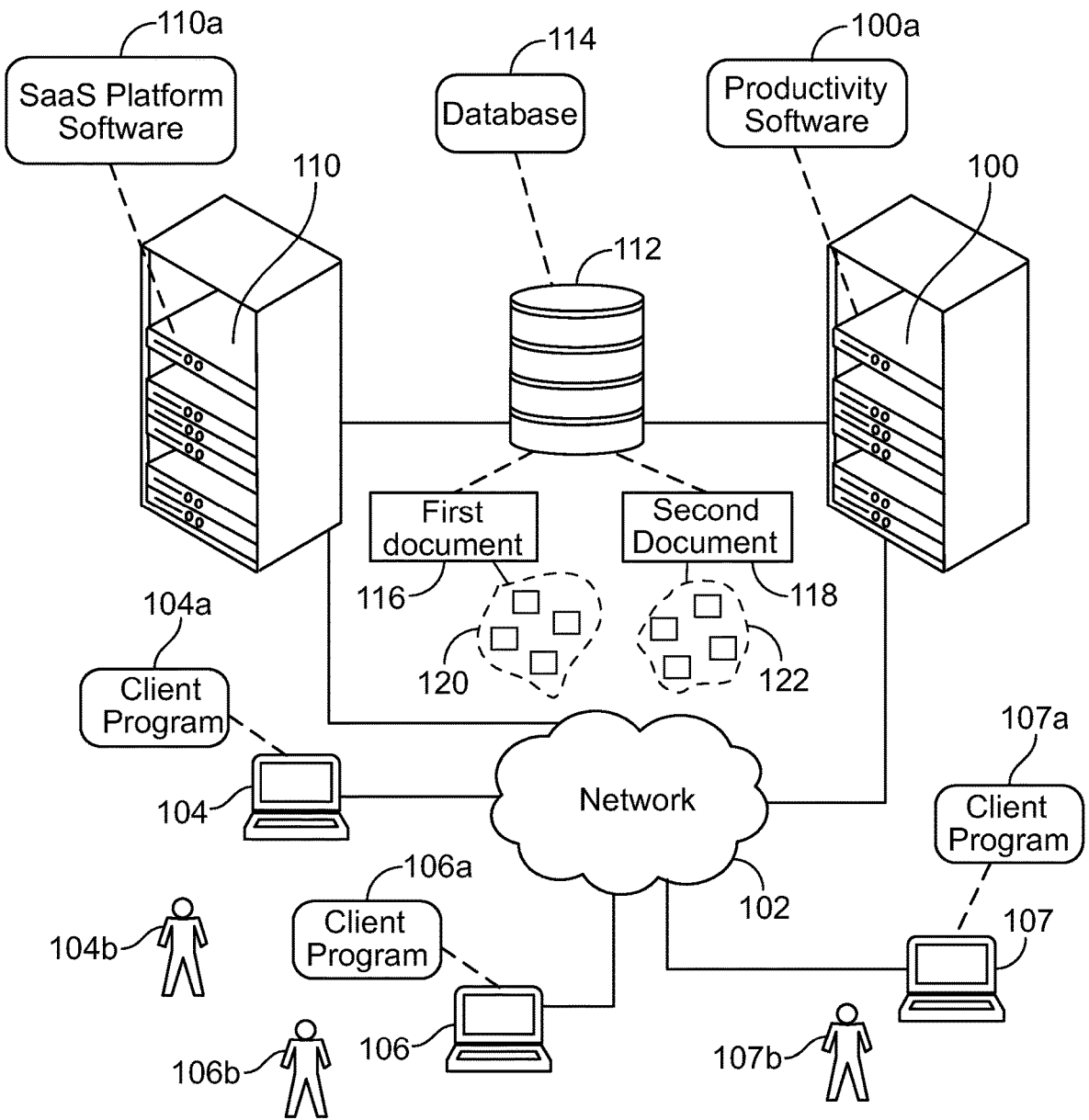
FIG. 1 is a block diagram illustrating an example networking environment in which various embodiments of the disclosure may be employed.

Various embodiments of the disclosure are implemented in a computer networking environment. Turning to FIG. 1, an example of such an environment is shown. A first computing device 100 (e.g., a hardware server device (also referred to as the "server" or the "server device") or a cluster of hardware server devices) is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 (also referred to as a "first client device" or, when there is no specific mention of the first computing device 100, the "first computing device"), a third computing device 106 (also referred to as a "second client device" or, when there is no specific mention of the first computing device 100, the "second computing device"), a fourth computing device 108 (also referred to as a "third client device" or, when there is no specific mention of the first computing device 100, the "third computing device"), and a fifth computing device 110 (e.g., a server or a cluster of servers, also referred to herein as "SaaS server"). For the sake of the various examples described herein, a first user 104b is assumed to operate the first client device 104, a second user 106b is assumed to operate the second client device 106, and a third user 108b is assumed to operate the third client device 108. It should be noted that the networking environment may include any number of computing devices (e.g., hundreds of client devices) and the number depicted in FIG. 1 is meant only to be representative.

It is to be understood that various embodiments may be carried out on the server device 100, the first client device 104, the second client device 106, the third client device 108, or other computing devices not depicted, with one or more of the first client device 104, the second client device 106, and the third client device 108 accessing the server device 100 via client programs (labeled 104a, 106a, and 108a respectively), such as thin, web-based clients. In an embodiment, the server device 100 executes productivity software 100a (e.g., a document editing application, a spreadsheet application, etc.) and the SaaS server 110 executes software-as-a-service ("SaaS") platform software 110a. The first computing device 100 and the SaaS server 110 are communicatively linked to a media storage device 112 (e.g., a memory or a redundant array of independent disks). Although FIG. 1 depicts the media storage device 112 as a single device, in fact, the media storage device 112 may be implemented as a single computing device or as multiple computing devices working together, and may represent a cloud storage service including multiple storage devices.

In another embodiment, the productivity software 100a and the SaaS platform software 110a execute on the same computing device (e.g., the server device 100 or the SaaS server 110). For example, the productivity software 100a could reside on one partition of the server device 100 while the SaaS platform software 110a could reside on another partition of the server device 100. In other embodiments, portions of the productivity software 100a execute on both the server device 100 and one or more of the first, second, and third client devices 104, 106, and 108 and/or portions of the SaaS platform software 110a may be executed on both the server device 100 and the SaaS server 110. With such network configurations, the first client device 104, the second client device 106, and the third client device 108 are configured to access the computing device or devices on which the productivity software 100a resides.

Stored on the media storage device 112 is a database 114, which is maintained by the SaaS platform software 110a, but whose operations are controlled by the productivity software 100a, which issues instructions to read from, write to, and modify the contents of the database 114 via the SaaS platform software 110a.

Figure 2:
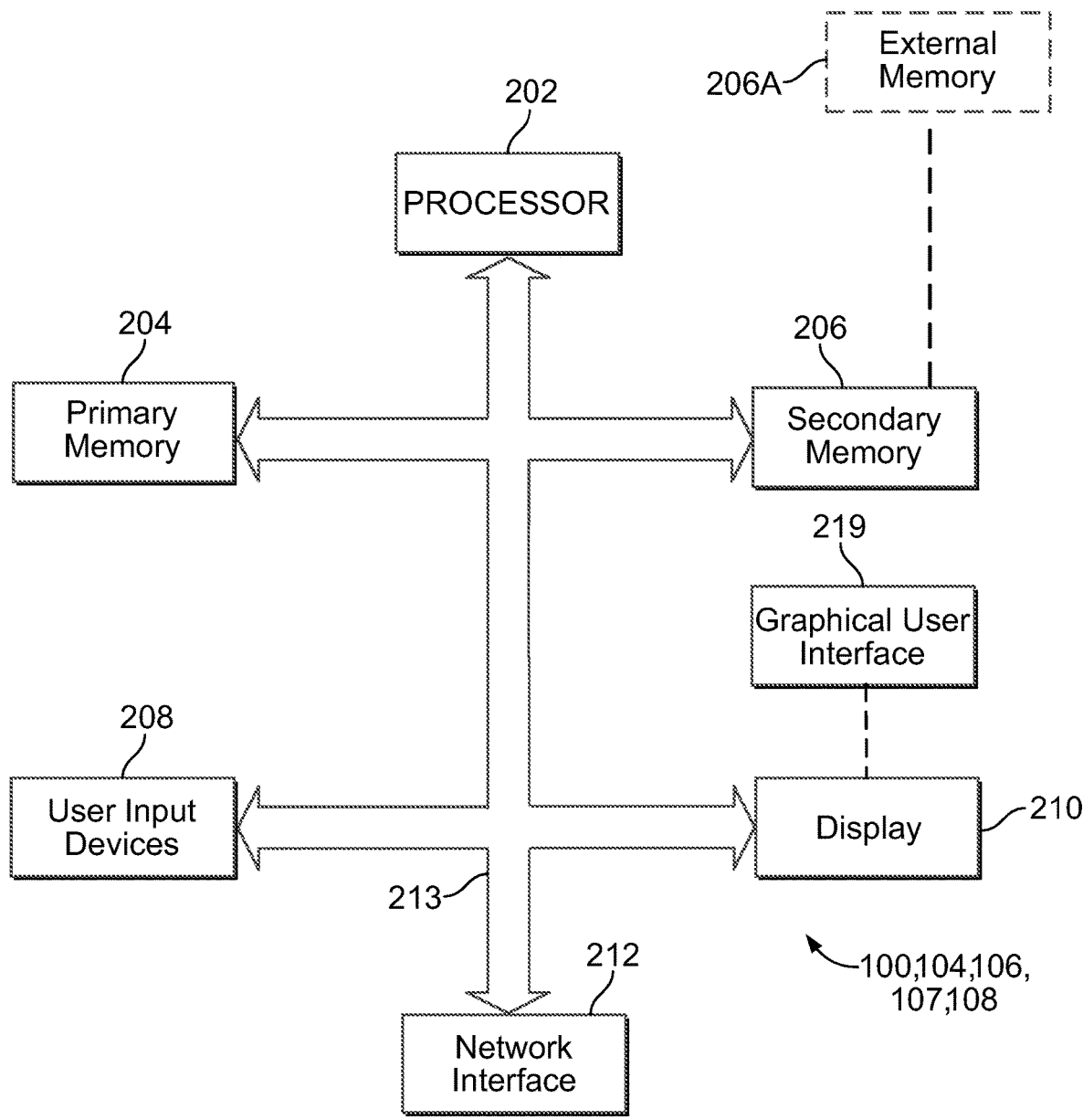
FIG. 2 is a block diagram of a computing device, according to an embodiment.

In one implementation, one or more of the computing devices of FIG. 1 (including the media storage device 112) have the general architecture shown in FIG. 2. The computing device of FIG. 2 includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

Referring still to FIG. 2, the memories 204 and 206 store instructions executable by the processor 202 and data. The term "local memory" as used herein refers to one or both the memories 204 and 206 (i.e., memory accessible by the processor 202 within the computing device). In some embodiments, the secondary memory 206 is implemented as, or supplemented by an external memory 206A. The media storage device 110 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

This disclosure may sometimes refer to one or more of the client program 104a, the client program 106a, the client program 108a, the productivity software 100a, the server device 100, the first client device 104, the second client device 106, or the third client device 108 as taking one or more actions. It is to be understood that such actions may involve one or more of the client program 104a, the client program 106a, the client program 108a, and the productivity software 100a taking such actions as: (a) the client program transmitting hypertext transport protocol commands such as "Get" and "Post" in order to transmit to or receive information from the productivity software 100a (e.g., via a web server), and (b) the client program running a script (e.g., JavaScript) to send information to and retrieve information from the productivity software 100a. The productivity software 100a may ultimately obtain information (e.g., web pages or data to feed into plugins used by the client programs) from the database 114 or the SaaS platform software 110a. It is to be understood, however, that when a computing device (or software executing thereon) carries out an action, it is the processor hardware 202 (the main processor and/or one or more secondary processors, such as a graphics processing unit, hardware codec, input-output controller, etc.) that carries out the action at the hardware level.

The disclosure will also refer to actions taking place via a user interface. There are various ways in which this takes place. In an embodiment, a client program on a client computing device (such as one of the computing devices 104, 106, and 108 of FIG. 1) presents a user interface, which it receives from the productivity software 100*a*. A user interacts with the user interface, and the client computing device transmits the user's input to the productivity software 100*a*, which responds to the user's input via the client program.

In an embodiment, the productivity software 100*a* (e.g., via the SaaS platform software 110*a*) manages various items of data stored on the media storage device 112. These data items are presented to the client programs 104*a*, 106*a*, and 108*a* as being part of one or more documents (e.g., text-based documents, spreadsheets, drawings, or presentations). However, the various data items are not necessarily organized into documents on the media storage device 112. Instead, the various data items may be separately accessible (e.g., referenced by their own individual globally unique IDs). In some cases, a data item may be used and edited in one document by a user who acts as a data producer, while a linked version of the same data item is used in another document by a user (or users) who acts as a data consumer.

In an embodiment, each user of the productivity software 100*a* has an associated user account that is managed by the productivity software 100*a*. For the sake of the various examples described herein, the first user 104*b* is assumed to be associated with a first user account, the second user 106*b* is assumed to be associated with a second user account, and the third user 107*b* is assumed to be associated with a third user account. It should be noted that while the first user 104*b* may utilize the productivity software 100*a* via the first user account on the first client device 104, the second user 106*b* via the second user account on the second client device 106, and the third user 107*b* via the third user account on the third client device 107, various other implementations are also possible. For example, two or more of the users 104*b*, 106*b*, and 107*b* may utilize the productivity software 100*a* via their respective user accounts on the same client device (e.g., one of the first client device 104, second client device 106, and third client device 107), in an embodiment.

According to an embodiment, the productivity software 100*a* manages permissions to the various data items and to documents that include such items. In one implementation, the permission levels granted to users for a given document include (a) owner, which gives a user permission to view the document, to edit the document, and to give others permissions to the document, (b) editor, which gives a user permission to view the document and to edit the document, and (c) viewer, which only gives a user permission to view the document.

To aid in the examples described herein, it will be assumed that data items constituting a first document 116 and data items constituting a second document 118 are stored on the media storage device. Among the data items of the first document 116 are a first set of data items 120. Among the data items of the second document 118 are linked versions 122 of the first set of data items 120. That is, the linked versions 122 are copies of the data items 120, which remain consistent (e.g., have the same values) as their original counterparts as long as there are no unpublished edits to the data items 120. Once one or more edits are made to a data item 120, its value may no longer match that of its linked version 122 unless and until that data item 120 is published (i.e., the edits to the data item are published), at which point the productivity software 100*a* will propagate the edit (e.g., the updated value) to the linked version 122, so that the linked version 122 once again has the same value as the original data item 120. This update to the linked version 122 will therefore appear on the user interface of any user who is a consumer of data item 120 (e.g., has opened a document in which the linked version 122 is being used), even if such user has not been granted any permissions to the document containing the data item 120.

Turning to FIGS. 3A-3G and FIGS. 4A-4E, an example of how two users collaborating on one document (depicted in FIGS. 3A-3G) can partially publish edits that are then used in another document (depicted in FIGS. 4A-4E) according to an embodiment will now be described. In this scenario, the first user 104*b* and the second user 106*b* are collaborating on the first document 116 which, in this example, is a table 302 (e.g., spreadsheet) and is shown on the web-based interface of FIG. 3A. The first user 104*b* is an owner of the first document 116 (e.g., has the highest level of permissions to the document) and the second user 106*b* is an editor of the first document 116 (i.e., has a level of permission that is lower than that of the first user 104*a*). Additionally, the third user 108*b* is working on the second document 118, which is a presentation shown on the web-based interface of FIG. 4A. The second document 118 contains copies of values of cells in the first document 116, which will be referred to herein as "linked versions" of the cells (i.e., linked versions of the data items contained in the cells). In particular, the second document 118 contains linked versions of cells B3, B4, E2, and E3. These linked values are respectively depicted in FIG. 4A as values 402, 404, 406, and 408. The linked values may be placed in segregated cells (e.g., spreadsheet cells or table cells) or alongside regular text and/or graphics (as in FIGS. 4A-4E). The fact that the content of cells B3, B4, E2, and E3 are linked to other documents is signified in the first document 116 in FIG. 3A by a visual indicator in each of these cells (a solid triangle in the upper left corner, in this case).

The user interface for the first document 116 (FIGS. 3A-3G) includes a publish control 304 that gives the user the option to (a) publish only selected edits (in this case, the edits made of one or more selected cells) that the user has made or (b) publish all of the edits that the user has made. Additionally, if the user has ownership permissions to the document, a third option and a fourth option may be presented—that of allowing the user to publish all edits in the document regardless of who made them and that of allowing the user to select which users to publish all changes for or to select which particular changes of other users to publish.

Figure 3A:
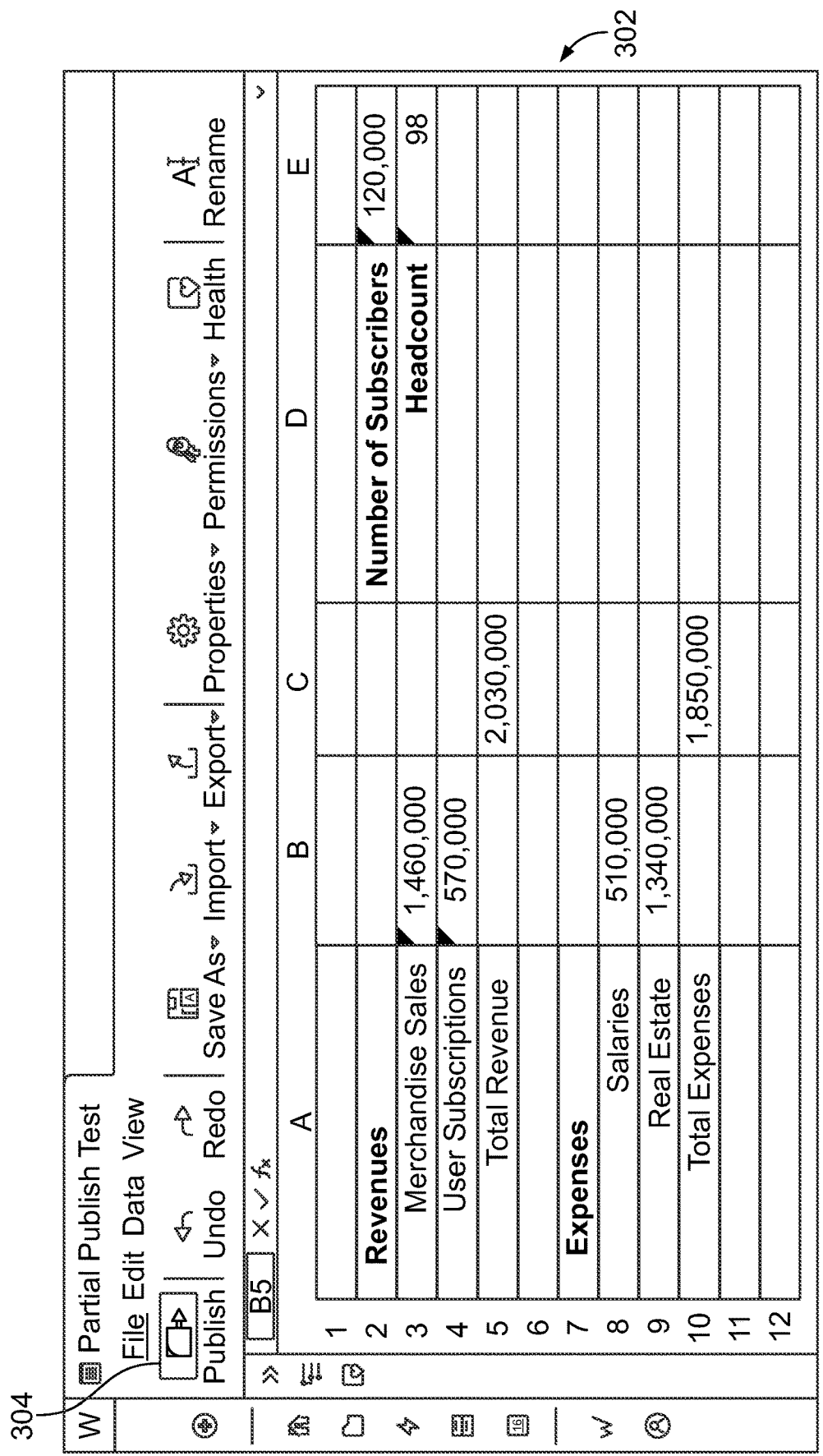

Referring to FIG. 3A, to illustrate an embodiment, cell C5 of the table 302 contains a formula that sums the values contained in cells B3 and B4 (e.g., =SUM(B3:B4)). Thus, any edits made to either cell B3 or B4 will impact cell C5. Similarly, if both cell B3 and B4 are edited, then in order to maintain data consistency, updates to all three of cells B3, B4, and C5 should be published at the same time. This is true regardless of which user makes the changes. For example, if the first user 104*b* makes changes to both of cells B3 and B4, but chooses to publish only the edits to cell B3, the first computing device 100 will publish the first user's edits to both cells. The impact on data consistency if B4 did not get published could be something obviously incorrect, like "5+4=10," appearing in the consumer document.

Figure 3C:
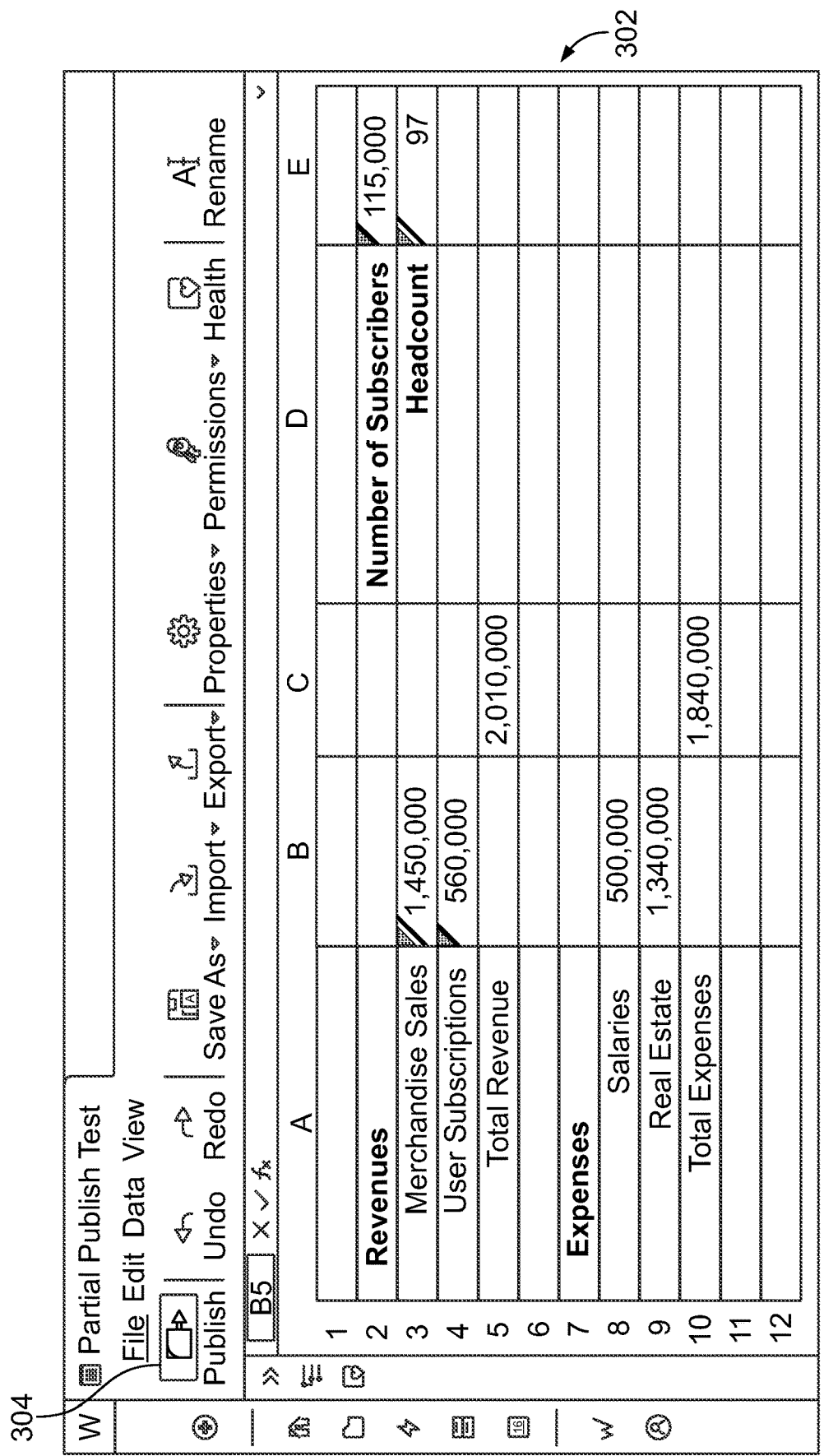

An example of how a subset of edits to the table 302 are partially published according to an embodiment will now be described. In this example, the first user 104*b* (e.g., via the first client device 104) edits cells B3 and E3, while the second user 106*b* (e.g., via the second client device 106) edits cells B4 and E2. The appearance of the first document 116 on the first client device 104 as rendered by the first client program 104a after the edits by the respective users have occurred is depicted in FIG. 3B. The appearance of the first document 116 on the second client device 106 as rendered by the second client program 106a is depicted in FIG. 3C. The edits made by the first user 104b and the edits made by the second user 106b cause visual indicators to appear on the cells that have been edited. The look of these visual indicators depends on which user made the edits. A user's own edits will cause a first type of visual indicator to appear, while another user's edits will cause a second type of visual indicator to appear. The visual indicator indicates that there are unpublished edits to the cell. In an embodiment, the last user who changes a cell is the "owner" of the change to the cell. For example, if the first user 104b changes cell B3 and then the second user 106b changes cell B4, then the second user 106b is the "owner" of the resulting change to cell C5.

In this example, the first type of visual indicator is a triangle in the upper left corner of the cell with an attached stripe opposite the corner (e.g., as shown in cell B3 of FIG. 3B). The second type of visual indicator in this example is a triangle in the upper left corner of the cell with a detached stripe opposite the corner (e.g. as shown in cell B3 of FIG. 3C). Note that the visual indicators seen by each of the first user and second user are not the same for the same cell. For example, cell B3 was edited by the first user 104b, so on the user interface of first user 104b, that cell (i.e., cell B3) has the first type of visual indicator. On the user interface of the second user 106b, the visual indicator is of the second type, since that cell (i.e., cell B3) was edited by "another user."

In addition to displaying a visual indicator on the cell that is being changed, the client devices 104 and 106 also display a visual indicator in any cell that is identified in a formula along with the cell being changed and is, itself, changed as a result. If, for example, cell C5 was linked, then when the first user edits cell B3, a visual indicator would also appear in cell C5. This is because cell C5 contains a formula that includes B3 and is changed as a result of the change in cell B3. Thus, any changes to cell C5 would need to be published along with changes to cell B3 (in order to maintain data consistency). Furthermore, in this example, the second user 106b made a change to cell B4, so the visual indicator on cell B4 is of the second type (with a gap between the triangle and the stripe in this case).

At this point, none of the edits in the first document 116 causes any of the values 402, 404, 406, or 408 of the second document 118 to change because neither the first user 104b nor the second user 106b has published any of their respective edits.

According to an embodiment, the productivity software 100a publishes not only edits specifically selected by a user but also those edits that were made to cells that are referenced by a formula that also references selected cell or cells. To accomplish this, in an embodiment, the productivity software 100a provides an operation defined by the following logic. Given that the first user makes an edit to a first cell and a second user makes an edit to a second cell, and given that the first user publishes the edit to the first cell: (a) when the first and second cell are referenced by a common formula, publish the edit of the second cell (e.g., update the linked version of the second cell on any computing device that is using the linked version), and (b) when the first cell and the second cell are not referenced by a common formula in the table, do not publish the edit to the second cell (e.g., leave the linked version of the second cell unchanged on any computing device that is using the linked version).

Figure 4A:
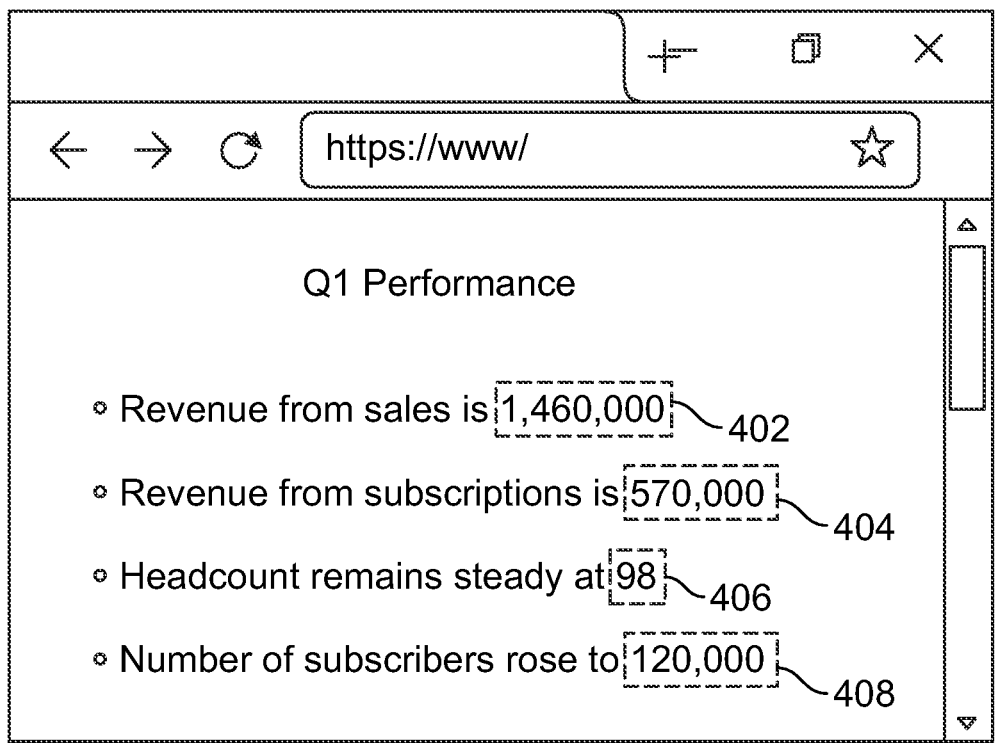
FIGS. 4A-4E illustrate a graphical user interface of a consumer of some of the data generated in the document of FIGS. 3A-3G, according to an embodiment.
Figure 4B:
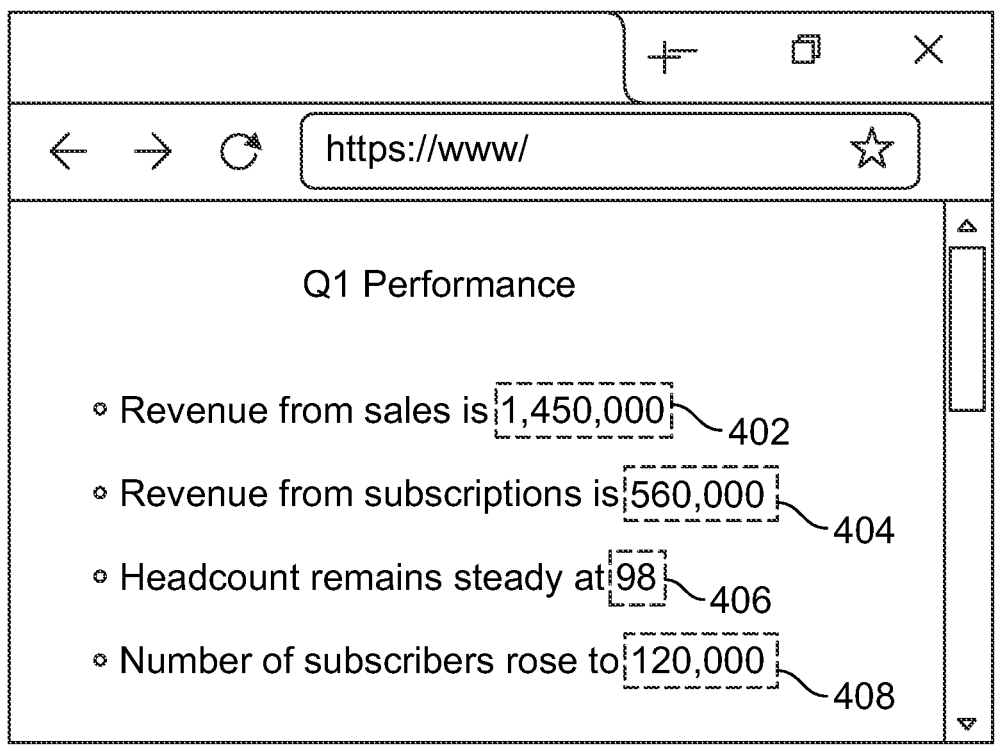

In the example of FIG. 3B, assume that the first user 104b activates (e.g., clicks on or touches) the publish control 304, which reacts by presenting the first user 104b the option to publish only the selected change, all of the first user's edits, or (because the first user 104b is an owner of the first document 104) all changes in the document. In this example, the first user 104b chooses to publish only the edits to cell B3. In response, the first client device 104 transmits, to the first computing device 100, an indication (e.g., a publication request) that cell B3 is to be published. In response, the first computing device 100 determines which, if any, other cells in the table 302 depend on or are referenced by a common formula with cell B3. In this case, cell B4 and cell B3 are referenced by a common formula (i.e., the formula of cell C5). Therefore, the first computing device 100 publishes the edits to cells B3 and B4, which changes the indicators in those cells to the basic "linked cell" indicator, as shown in FIG. 3D. The first computing device 100 also updates the values 402 and 404 of the second document 118 as displayed on the third computing device 108 in order to reflect the (now published) edit made to cell B4, as shown in FIG. 4B, but leaves values 406 and 408 (the linked versions of cells E2 and E3) unchanged. It should be noted that the changes to cell B4 are published in response to the first user's action, even though the first user 104b did not make any edits to that cell (it was the second user that made the edit). It should be noted that publishing edits in fact publishes the latest edit. For example, however many other changes were made to cell B4 (by the second user, first user, or other users), the value that gets propagated to the linked versions of the published cells is the value that was in the cell at the time of publishing.

Figure 3E:
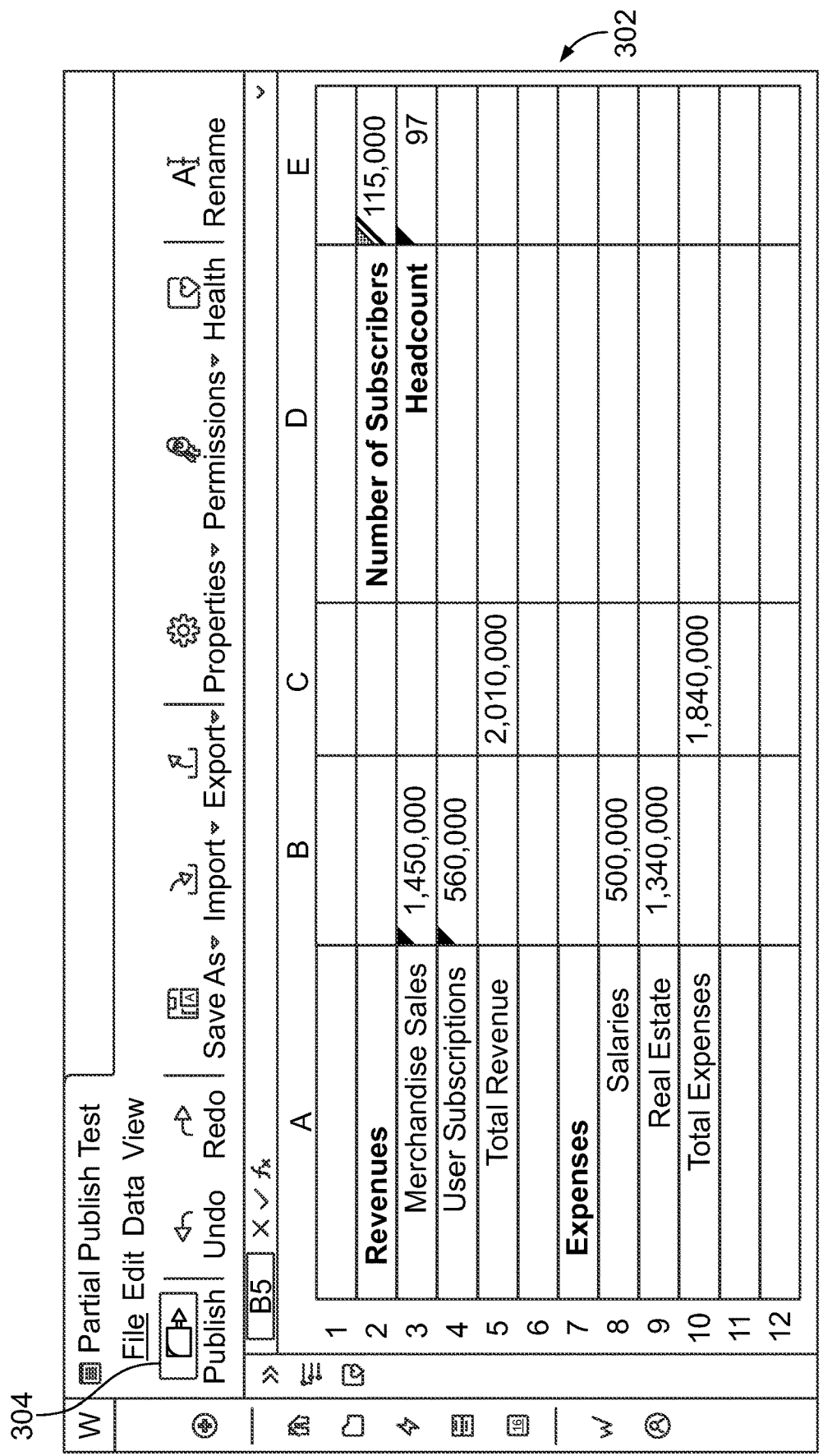
Figure 4C:
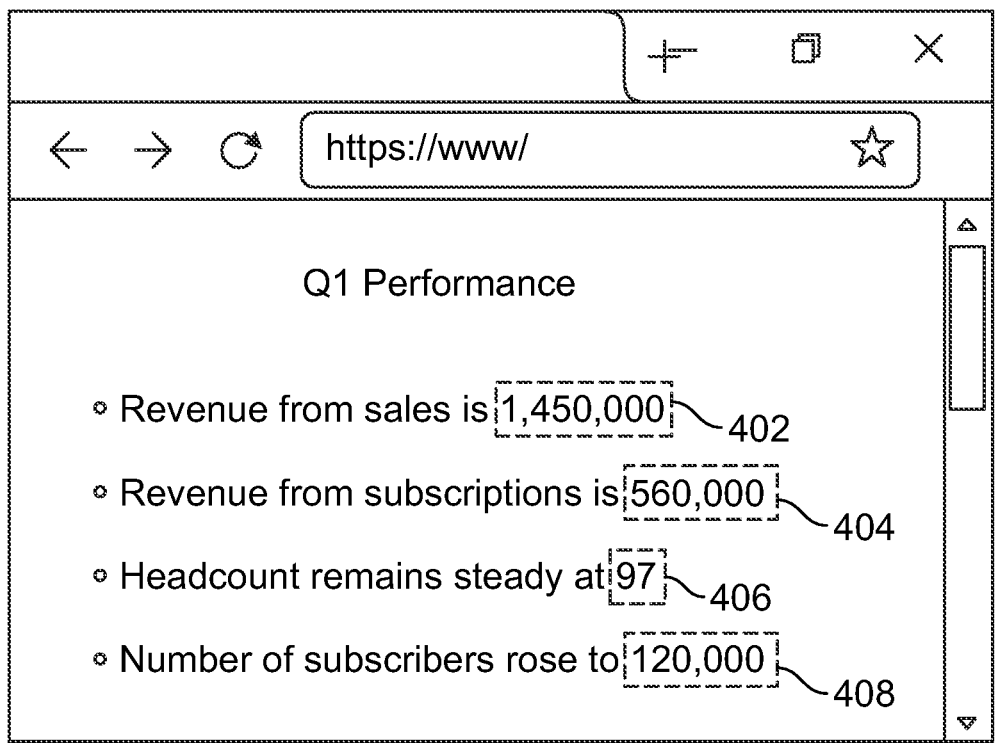

Continuing with the example, assume that the second user 106b (e.g., via the second client device 106) selects cell E3 and then activates (e.g., clicks on or touches) the publish control 304, which reacts by presenting the second user 106b the option to publish only the selected change or all of the second user's changes. In this example, the second user 106b selects the option of publishing only the change to cell E3. In response, the second client device 106 transmits, to the first computing device 100, an indication that the edit to cell E3 is to be published. In response, the first computing device 100 determines which, if any, other cells in the table 302 depend on or are referenced by a common formula with cell E3. In this example, the first computing device 100 determines that no other cell depends on E3 and also that no other cell is referenced by a common formula with E3. Therefore, the first computing device 100 publishes the edit to cell E3, which changes the indicator in that cell to the basic "linked cell" indicator, as shown in FIG. 3E. Additionally, the first computing device 100 updates the value 406 of the second document 118 as displayed on the third computing device 108, as shown in FIG. 4C, but leaves the value 408 (the linked versions of cell E2) unchanged.

Figure 3F:
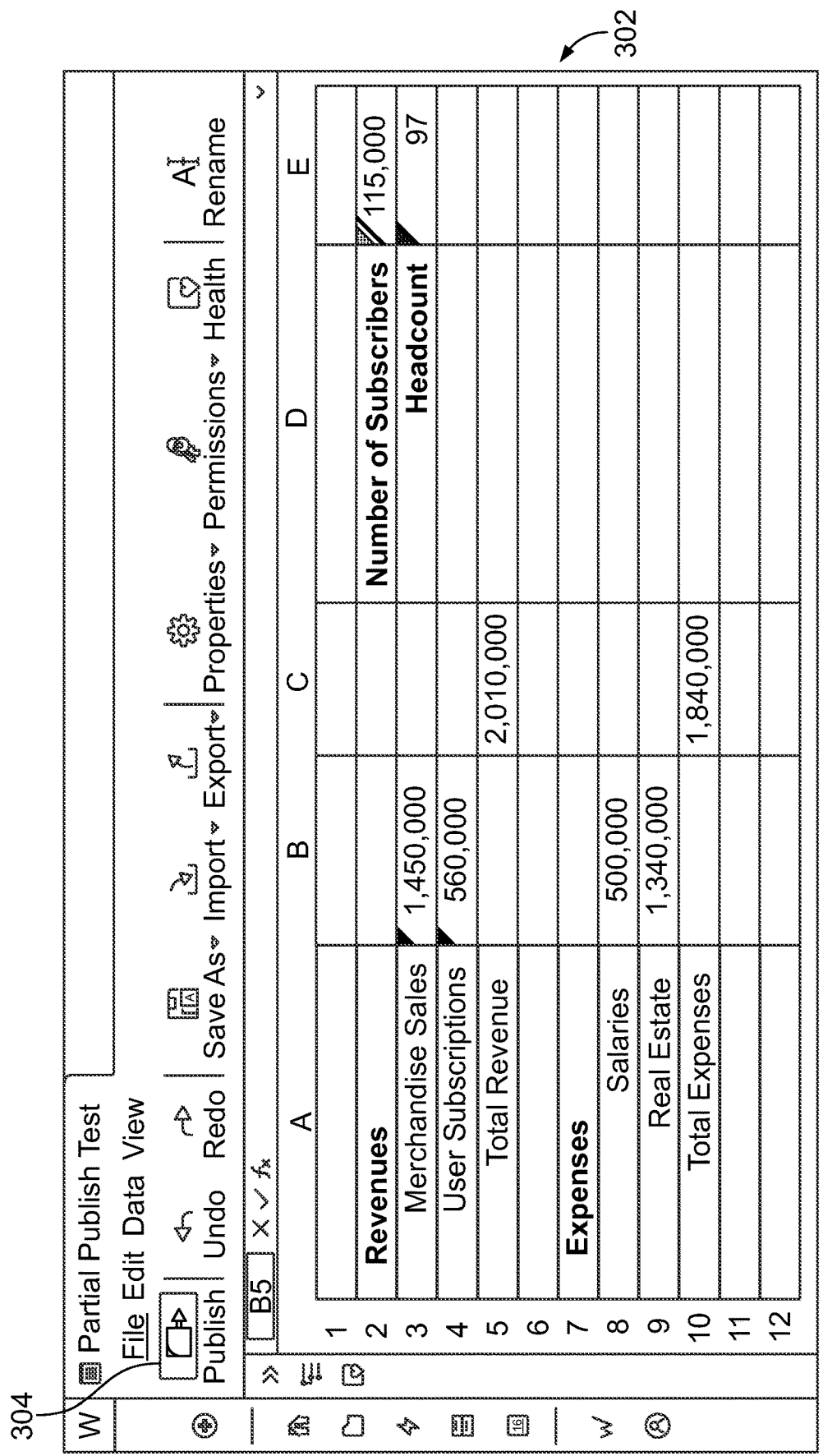
Figure 4D:
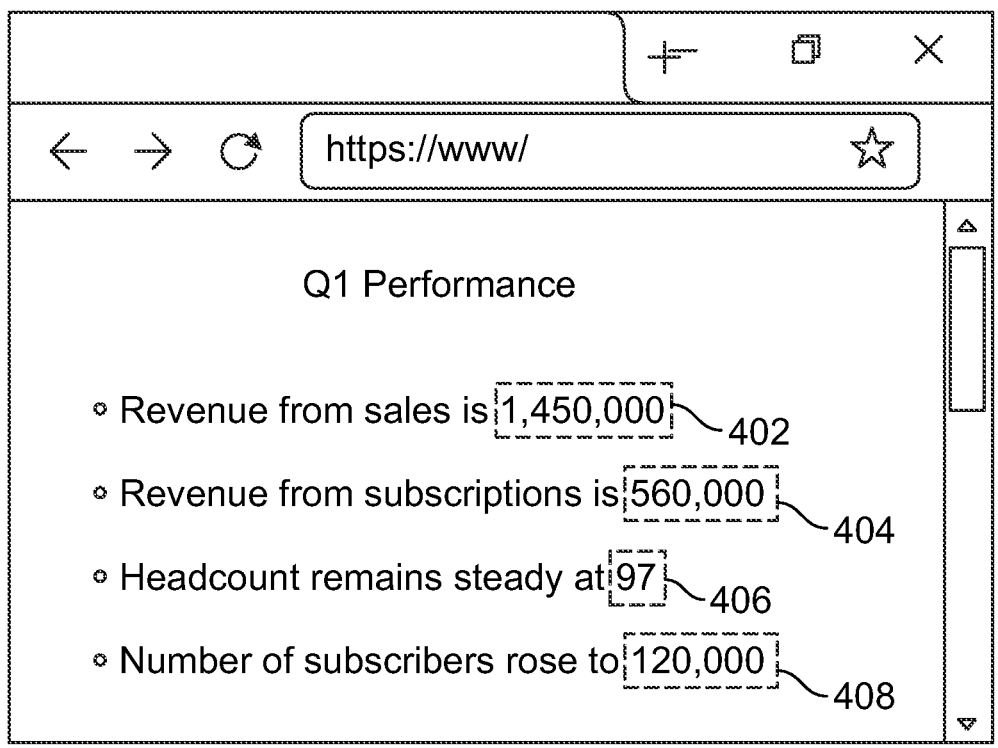

Changing the previous example, according to an embodiment, instead of selecting to publish only the change to cell B3 (from the user interface of FIG. 3B), the first user 104b selects the option to publish all of the first user's changes. In response, the first client device 104 transmits, to the first computing device 100, an indication that the edits to cell B3 and cell E3 (or a blanket indication that all cells edited by the first user 104b) are to be published. In response, the first computing device 100 determines which, if any, other cells in the table 302 depend on cell B3 or cell E3, or are referenced by a common formula with cell B3 or E3. The first computing device 100 determines that cell B4 should be published. This is in addition to cells B3 and E3. Therefore, the first computing device 100 publishes the edits to cells B3, B4, and E3, which changes the indicators in those cells to the basic "linked cell" indicator, as shown in FIG. 3F. Additionally, the first computing device 100 updates the values 402, 404, and 406 of the second document 118 as displayed on the third computing device 108, as shown in FIG. 4D, but leaves value 408 (the linked versions of cell E2) unchanged.

Figure 3G:
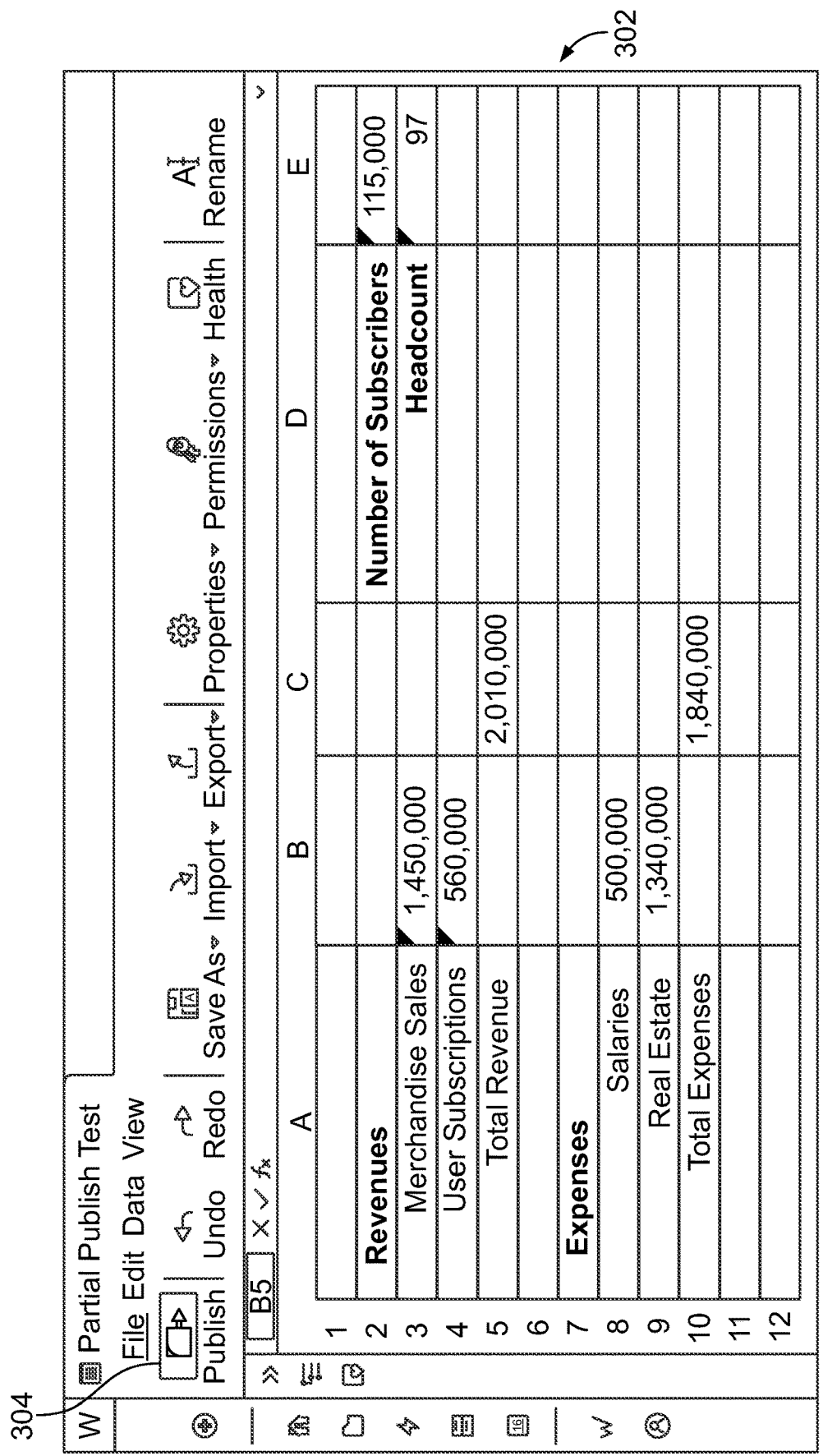
Figure 4E:
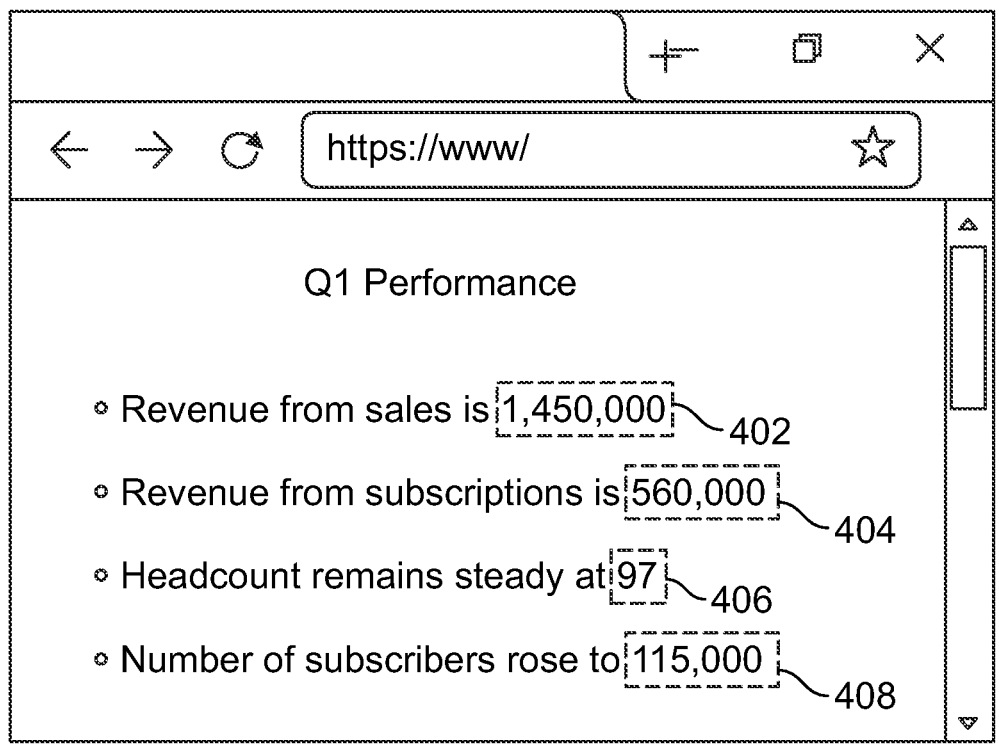

Changing the previous example again, according to an embodiment, instead of selecting to publish only the change to cell B3 or to publish only those changes that the first user 104*b* has made (from the user interface of FIG. 3B), the first user 104*b* selects the option to publish all of the changes in the first document 116 (including those of the second user 106*a* and all other users). In response, the first client device 104 transmits, to the first computing device 100, an indication that all cell edits in the table 302 are to be published. Therefore, the first computing device 100 publishes the edits to cells B3, B4, E2, and E3, which changes the indicators in those cells to the basic "linked cell" indicator, as shown in FIG. 3G. In response, the first computing device 100, updates the values 402, 404, 406, and 408 of the second document 118 as displayed on the third computing device 108, as shown in FIG. 4E.

In an embodiment, the user interface depicted in FIGS. 3A-3G allows a user to hover over a cell in order to receive a notification regarding the edit status of the cell. For example, in FIG. 3B, if the first user hovers over cell B3, the first computing device 100 may send the first client device 104 an on-screen notification that "Unpublished change by you" while hovering over cell B4 may cause the notification "Unpublished changes by User 2." Furthermore, the first computing device 100 could send on-screen notifications to the first user 104*b* and the second user 106*b* when one or the other user has published edits. For example, if the first user 104*b* publishes all of the first user's edits, the second user 106*b* might receive the on-screen notification "User 1 just shared changes."

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes" "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A computing device for partially publishing edits to a document, the computing device comprising a processor and a non-transitory computer-readable memory, wherein the processor is configured to carry out instructions from the memory that configure the computing device to:
    display, on a first user account on a first computing device and on a second user account, a first document comprising a first cell and a second cell;
    display a second document comprising a linked version of the first cell and a linked version of the second cell, wherein content of the linked version of the first cell matches that of the first cell and content of the linked version of the second cell matches that of the second cell;
    receive, at the computing device and from the first user account, an edit of the first cell;
    receive, at the computing device and from the second user account, an edit of the second cell;
    receive, at the computing device and from the first user account, an indication that the edit of the first cell is to be published; and
    in response to receiving the indication that the edit of the first cell is to be published,
        publish, by the computing device, the edit of the first cell by making the edit of the first cell to the linked version of the first cell, wherein the linked version of the first cell of the displayed second document is updated with the edit of the first cell, and
        leave the linked version of the second cell unchanged so that the content of the linked version of the second cell no longer matches that of the second cell.

2. The computing device of claim 1, wherein the processor is further configured to carry out instructions from the memory that configure the computing device to:
    receive, from the second user account, an indication that the edit of the second cell is to be published; and
    in response to the indication received from the second user account, publish the edit of the first cell by making the edit of the second cell to the linked version of the second cell, wherein the linked version of the first cell of the displayed second document is updated with the edit of the first cell.

3. The computing device of claim 1, wherein a first user is using the first user account, and the processor is further configured to carry out instructions from the memory that configure the computing device to:
    display an indicator on the first cell to indicate that the first user has unpublished edits to the first cell; and
    remove the indicator after receiving the indication that the edit to the first cell is to be published.

4. The computing device of claim 1, wherein a first user is using the first user account, and the processor is further configured to carry out instructions from the memory that configure the computing device to:
    display, on the first user account, a menu that gives the first user an option to publish all edits that the first user has made to the first document.

5. The computing device of claim 1, wherein a first user is using the first user account and a second user is using the second user account, and wherein the first user is an owner of the first document, wherein the processor is further configured to carry out instructions from the memory that configure the computing device to:
    display, on the first user account, a menu that gives the first user an option to publish all changes that both the first user and the second user have made to the first document.

6. The computing device of claim 1, wherein a first user is using the first user account and a second user is using the second user account, and wherein the processor is further configured to carry out instructions from the memory that configure the computing device to, prior to receiving the indication that the edit of the first cell is to be published:
    display a first type of indicator on the first cell to indicate that the first user has unpublished edits to the first cell; and
    display a second type of indicator on the second cell to indicate that the second user has unpublished edits to the second cell, the second type of indicator being different from the first type of indicator.

7. The computing device of claim 6, wherein the processor is further configured to carry out instructions from the memory that configure the computing device to, after receiving the indication that the edit to the first cell is to be published:
    replace the first type of indicator on the first cell with a third type of indicator to indicate that the first cell is linked to another cell.

8. The computing device of claim 1, wherein:
    the edit of the first cell is a most recent edit of the first cell and the indication that the edit of the first cell is to be published is received after the most recent edit of the first cell; and
    the processor is further configured to carry out instructions from the memory that configure the computing device to:
    receive a plurality of edits of the first cell, the plurality of edits including the most recent edit; and
    make the edit of the first cell comprises making only the most recent edit to the first cell to the linked version of the first cell.

9. The computing device of claim 8, wherein the plurality of edits further include edits from the second user account.

10. The computing device of claim 1, wherein the processor is further configured to carry out instructions from the memory that configure the computing device to send, to the second user account, a notification of an unpublished change to the linked version of the second cell.

11. A computing device for partially publishing edits to a document, the computing device comprising a processor and a non-transitory computer-readable memory, wherein the processor is configured to carry out instructions from the memory that configure the computing device to:
  display, on a first user account on a first computing device and on a second user account, a first document comprising a first cell and a second cell;
  display a second document comprising a linked version of the first cell and a linked version of the second cell, wherein the content of the linked version of the first cell matches that of the first cell and the content of the linked version of the second cell matches that of the second cell;
  receive, from the first user account, an edit of the first cell;
  receive, from the second user account, an edit of the second cell;
  receive, from the first user account, an indication that the edit of the first cell is to be published; and
  in response to receiving the indication that the edit of the first cell is to be published,
    publish the edit of the first cell by making the edit of the first cell to the linked version of the first cell, wherein the linked version of the first cell of the displayed second document is updated with the edit of the first cell, and
    leave the linked version of the second cell unchanged so that the content of the linked version of the second cell no longer matches that of the second cell, including sending, to the second user account, a notification of an unpublished change to the linked version of the second cell.

12. The computing device of claim 11, wherein the processor is further configured to carry out instructions from the memory that configure the computing device to:
  receive, from the second user account, an indication that the edit of the second cell is to be published; and
  in response to the indication received from the second user account, publish the edit of the first cell by making the edit of the second cell to the linked version of the second cell, wherein the linked version of the first cell of the displayed second document is updated with the edit of the first cell.

13. The computing device of claim 11, wherein a first user is using the first user account, wherein the processor is further configured to carry out instructions from the memory that configure the computing device to:
  display an indicator on the first cell to indicate that the first user has unpublished edits to the first cell; and
  remove the indicator after receiving the indication that the edit to the first cell is to be published.

14. The computing device of claim 11, wherein a first user is using the first user account, wherein the processor is further configured to carry out instructions from the memory that configure the computing device to:
  display, on the first user account, a menu that gives the first user an option to publish all edits that the first user has made to the first document.

15. The computing device of claim 11, wherein a first user is using the first user account and a second user is using the second user account, and wherein the first user is an owner of the first document, wherein the processor is further configured to carry out instructions from the memory that configure the computing device to:
  display, on the first user account, a menu that gives the first user an option to publish all changes that both the first user and the second user have made to the first document.

16. A computing device for partially publishing edits to a document, the computing device comprising a processor and a non-transitory computer-readable memory, wherein the processor is configured to carry out instructions from the memory that configure the computing device to:
  display, on a first user account on a first computing device and on a second user account, a first document comprising a first cell and a second cell;
  display a second document comprising a linked version of the first cell and a linked version of the second cell, wherein the content of the linked version of the first cell matches that of the first cell and the content of the linked version of the second cell matches that of the second cell;
  receive a plurality of edits of the first cell, the plurality of edits, including receiving, from the first user account, an edit of the first cell that is a most recent edit of the first cell, and receiving edits from the second user account;
  receive, from the second user account, an edit of the second cell;
  receive, from the first user account, an indication that the edit of the first cell is to be published, wherein the indication that the edit of the first cell is to be published is received after the most recent edit of the first cell; and
  in response to receiving the indication that the edit of the first cell is to be published,
    publishing the edit of the first cell by making the edit of the first cell to the linked version of the first cell, including making only the most recent edit to the first cell to the linked version of the first cell, wherein the linked version of the first cell of the displayed second document is updated with the edit of the first cell, and
    leaving the linked version of the second cell unchanged so that the content of the linked version of the second cell no longer matches that of the second cell, including sending, to the second user account, a notification of an unpublished change to the linked version of the second cell.

17. The computing device of claim 16, wherein the processor is further configured to carry out instructions from the memory that configure the computing device to:
  receive, from the second user account, an indication that the edit of the second cell is to be published; and
  in response to the indication received from the second user account, publish the edit of the first cell by making the edit of the second cell to the linked version of the second cell, wherein the linked version of the first cell of the displayed second document is updated with the edit of the first cell.

18. The computing device of claim 16, wherein a first user is using the first user account, wherein the processor is further configured to carry out instructions from the memory that configure the computing device to:
  display an indicator on the first cell to indicate that the first user has unpublished edits to the first cell; and
  remove the indicator after receiving the indication that the edit to the first cell is to be published.

19. The computing device of claim 16, wherein a first user is using the first user account, wherein the processor is further configured to carry out instructions from the memory that configure the computing device to:
  display, on the first user account, a menu that gives the first user an option to publish all edits that the first user has made to the first document.

20. The computing device of claim 17, wherein a first user is using the first user account and a second user is using the second user account, and wherein the first user is an owner of the first document, wherein the processor is further configured to carry out instructions from the memory that configure the computing device to:
  display, on the first user account, a menu that gives the first user an option to publish all changes that both the first user and the second user have made to the first document.

* * * * *